United States Patent
Lu (10) Patent No.: US 10,884,284 B2
(45) Date of Patent: Jan. 5, 2021

(54) COLOR FILM SUBSTRATE AND PREPARATION METHOD THEREFOR, DISPLAY DEVICE AND GLUE APPLYING SYSTEM

(71) Applicants: BOE TECHNOLOGY GROUP CO., LTD., Beijing (CN); Hefei Xinsheng Optoelectronics Technology Co., Ltd., Anhui (CN)

(72) Inventor: Yanchun Lu, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

(*) Notice: Subject to any disclaimer, the term of this patent is extended or adjusted under 35 U.S.C. 154(b) by 342 days.

(21) Appl. No.: 15/781,753

(22) PCT Filed: Sep. 30, 2017

(86) PCT No.: PCT/CN2017/104811
§ 371 (c)(1),
(2) Date: Jun. 6, 2018

(87) PCT Pub. No.: WO2018/149151
PCT Pub. Date: Aug. 23, 2018

(65) Prior Publication Data
US 2020/0271989 A1    Aug. 27, 2020

(30) Foreign Application Priority Data
Feb. 15, 2017 (CN) .......................... 2017 1 0081739

(51) Int. Cl.
G02F 1/1335    (2006.01)
G02F 1/1333    (2006.01)

(52) U.S. Cl.
CPC .. *G02F 1/133516* (2013.01); *G02F 1/133345* (2013.01); *G02F 1/133512* (2013.01)

(58) Field of Classification Search
CPC ................................................. G02F 1/133516
See application file for complete search history.

(56) References Cited

U.S. PATENT DOCUMENTS 9,436,050 B2    9/2016  Ye
2004/0248384 A1* 12/2004  Kuo ................. H01L 27/14625
                                                       438/462
(Continued)

FOREIGN PATENT DOCUMENTS

CN    101846836 A    9/2010
CN    101889242      11/2010
(Continued)

OTHER PUBLICATIONS

First Office Action for Chinese Patent Application No. 201710081739.3 dated Apr. 3, 2019.
(Continued)

*Primary Examiner* — Sang V Nguyen
(74) *Attorney, Agent, or Firm* — Calfee, Halter & Griswold LLP (57) ABSTRACT

The present disclosure provides a color film substrate and a preparation method therefor, a display device and a glue applying system. The method for preparing a color film substrate includes forming a transparent insulating layer, wherein thickness of the transparent insulating layer is determined according to thickness of a metal film layer on an array substrate that is paired with the color film substrate.

19 Claims, 2 Drawing Sheets

(56) References Cited

U.S. PATENT DOCUMENTS

2010/0255222 A1   10/2010  Hirato et al.
2016/0147103 A1*  5/2016  Huang .................. G02F 1/1339
                                            349/43
2016/0178953 A1*  6/2016  Ye ..................... G02F 1/133516
                                            445/24
2017/0010507 A1*  1/2017  Cheng ............... G02F 1/133707

FOREIGN PATENT DOCUMENTS

| CN | 104570455 | 4/2015 |
| CN | 105093653 | 11/2015 |
| CN | 105140242 A | 12/2015 |
| CN | 106324895 A | 1/2017 |
| CN | 106773265 | 5/2017 |
| GB | 2550073 | 11/2017 |
| JP | 2002148605 | 5/2002 |
| JP | 20101069888 | 8/2010 |

OTHER PUBLICATIONS

English translation of International Search Report and Written Opinion from PCT/CN2017/104811 dated Dec. 28, 2017.

* cited by examiner

COLOR FILM SUBSTRATE AND PREPARATION METHOD THEREFOR, DISPLAY DEVICE AND GLUE APPLYING SYSTEM

CROSS-REFERENCE TO RELATED APPLICATIONS

This application is based upon International Application No. PCT/CN2017/104811, flied on Sep. 30, 2017, which is based upon and claims priority to Chinese patent application No. 201710081739.3 filed on Feb. 15, 2017, the entire contents of which are hereby incorporated by reference.

TECHNICAL FIELD

The present disclosure relates to the field of display technology. In particular, the present disclosure relates to a color film substrate, a preparation method therefor, a display device, and a glue applying system.

BACKGROUND

With the development of technology of TFT-LCD (Thin Film Transistor-Liquid Crystal Display), the requirements for the picture quality of the display are increasing.

SUMMARY

Figure 1:
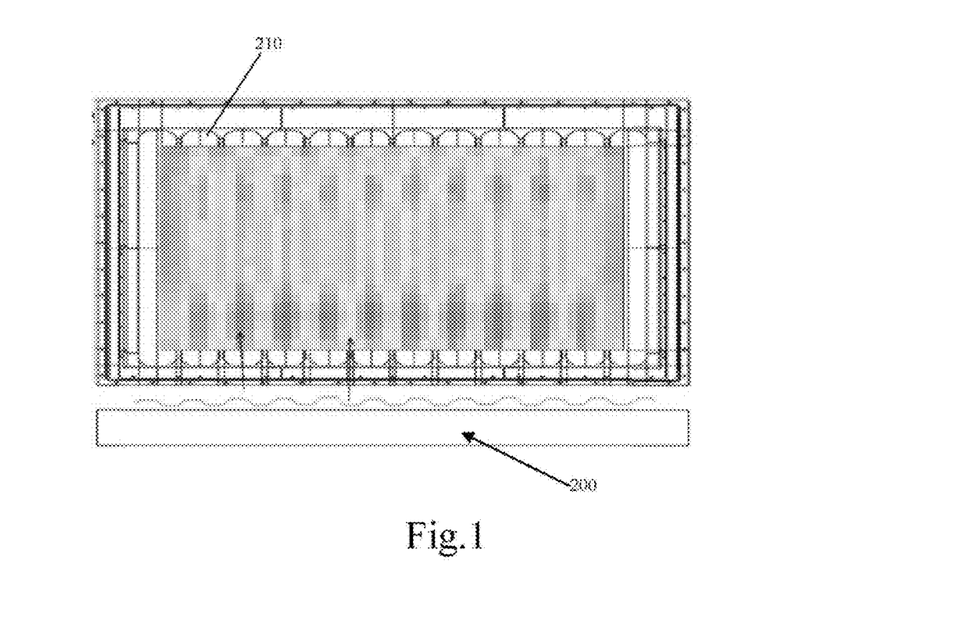
FIG. 1 is a top view of a TFT substrate according to an embodiment of the present disclosure and a schematic structural view of a corresponding side view.

The present disclosure was completed based on the inventor's following findings:

In the course of research, the present inventor found that the specific structure of a TFT-LCD display panel mainly includes a CF (Color Film) substrate, a TFT (Thin Film Transistor) substrate, and a liquid crystal filled therebetween. Referring to FIG. 1, the lower figure is a schematic view of the structure of the array substrate, the upper figure is a view of the measured thickness of the metal film layer on the array substrate by the four-probe method, and the darker the color is, the larger the thickness of the film layer is. In the process of film plating with multiple targets 210 arranged in parallel on the upper surface of the TFT substrate 200, it is prone to form a film with a relatively high thickness (darker color) in the middle of a single target and a relatively thin film thickness (lighter color) in the gap between two targets. The inventor also found that the difference in thickness of the upper surface of the TFT substrate is about 300 Å. The CF substrate generally includes a substrate, a black matrix layer and a color filtering layer spacedly provided on the lower surface of the substrate, and a transparent insulation layer covering the black matrix layer and the color filtering layer, wherein the lower surface of the transparent insulation layer is a flat plane, and since the orientating film is a film layer with uniform thickness, the difference in thickness of the surface of the array substrate cannot be compensated for, and thus, due to a height difference caused by forming films by sputtering on the array substrate, the cell gap between the lower surface of the CF substrate and the upper surface of the TFT substrate after having been paired will have a problem of poor uniformity, and the mura phenomenon tends to occur during use of the display.

After deep research, the inventor of the present disclosure found that in the preparation process of the CF substrate, the thickness of the transparent insulating layer of the CF substrate may be adjusted correspondingly according to feedback information of the array on the surface of the TFT substrate, such that the adjustability of thickness of the CF substrate can be realized. Accordingly, the difference in thickness of the array on the surface of the TFT substrate is compensated for; furthermore the uniformity of the cell gap after the liquid crystal is filled in the cell section is improved, and the picture quality problem such as Mura due to the difference in thickness of the sputtered film formed on the upper surface of the TFT substrate may be effectively solved.

In this regard, an object of the present disclosure is to provide a method for preparing a color film substrate that improves the cell gap uniformity after liquid crystal is filled in the cell section.

In a first aspect of the present disclosure, the present disclosure provides a method of preparing a color film substrate.

According to an embodiment of the present disclosure, a method of preparing a color film substrate comprises forming a transparent insulating layer, wherein the thickness of the transparent insulating layer is determined according to the thickness of the metal film layer on the array substrate that is paired with the color film substrate.

The inventor has unexpectedly found that with the method for preparing a color film substrate according to the embodiment of the present disclosure, the thickness of the transparent insulating layer formed on the CF substrate is adjusted according to the thickness information of the metal film layer on the array substrate having a difference in height on the surface, such that specific requirements between the array substrate and the color film substrate can be met according to actual use in order to improve its use effect. In some embodiments of the present disclosure, the thickness of the transparent insulating layer may be allowed to compensate for the difference in the thickness of the upper surface of the array substrate, thereby effectively improving the uniformity of the cell gap after the liquid crystal is filled in the cell section, and effectively solving the picture quality problems such as Mura caused by the difference in thickness of the sputtered film on the upper surface of the TFT substrate.

In addition, the method for preparing a color film substrate according to the above embodiments of the present disclosure may also have the following additional technical features:

According to an embodiment of the present disclosure, the transparent insulating layer is formed by applying glue, and the step of forming the transparent insulating layer includes: acquiring film forming data of the metal film layer on the array substrate paired with the color film substrate; determining the thickness of the metal film layer according to the film forming data; determining the thickness of the transparent insulating layer according to the thickness of the metal film layer; determining the pressure-time graph for applying glue according to the thickness of the transparent insulating layer; applying glue according to the pressure-time graph for applying glue on a side, near the array substrate, of the color film substrate to form the transparent insulating layer.

According to an embodiment of the present disclosure, the film forming data includes square resistance of the metal film layer.

According to an embodiment of the present disclosure, the difference between a maximum value and a minimum value of vertical distances of points on a surface of the transparent insulating layer facing the array substrate from a surface of the metal film layer facing the color film substrate does not exceed 2% of the maximum value. As such, the display device including the color film substrate has a satisfactory display effect, and picture quality problems such Mura and the like are significantly relieved.

In a second aspect of the present disclosure, the present disclosure provides a color film substrate.

According to an embodiment of the present disclosure, the color film substrate is prepared by the above method.

The inventor has unexpectedly found that in the color film substrate according to the embodiment of the present disclosure, since the thickness of the transparent insulating layer on the lower surface thereof is adjusted according to the information on the surface thickness of the TFT substrate (i.e., the array substrate) that is paired with the color film substrate, the uniformity of the cell gap after liquid crystal is filled in cell section is improved, and the picture quality problems such as Mura due to the difference in thickness of the sputtered film formed on the upper surface of the TFT substrate are effectively solved. Those skilled in the art can understand that the features and advantages described above for the method for preparing the color film substrate are still applicable to the color film substrate. Repeated description will not be made here.

In a third aspect of the present disclosure, the present disclosure provides a display device.

According to an embodiment of the present disclosure, the display device includes: an array substrate; a color film substrate provided opposite to the array substrate; a liquid crystal layer provided between the array substrate and the color film substrate, wherein a metal film layer is provided on a side of the array substrate near the color film substrate, a transparent insulating layer is provided on a side of the color film substrate near the array substrate, and the thickness of the transparent insulation layer is determined according to the thickness of the metal film layer.

The inventor has unexpectedly found that the display device according to the embodiment of the present disclosure can effectively solve the picture quality problems such as Mura due to its better uniformity of cell gap.

In addition, the display device according to the above embodiment of the present disclosure may also have the following additional technical features:

According to an embodiment of the present disclosure, the color film substrate further comprises: a substrate; a black matrix layer provided on a lower surface of the substrate and having a plurality of openings; a color filtering layer provided on a side of the substrate facing the array substrate and being in the plurality of openings of the black matrix layer; and a transparent insulation layer provided on sides of the color filtering layer and of the black matrix layer away from the substrate, wherein the difference between a maximum value and a minimum value of vertical distances of points on a surface of the transparent insulating layer facing the array substrate from a surface of the metal film layer facing the color film substrate does not exceed 2% of the maximum value. As such, the display device including the color film substrate has a satisfactory display effect, and picture quality problems such Mura and the like are significantly relieved.

According to embodiments of the present disclosure, the specific type of the display device is not particularly limited as long as it is a device having a display function. In some embodiments of the present disclosure, the display device may be any product that can realize function of display, such as a display panel, a mobile phone, a tablet computer, a game machine, a wearable device, a home appliance, and the like.

In a fourth aspect of the present disclosure, the present disclosure provides a glue applying system.

According to an embodiment of the present disclosure, the glue applying system includes: a thickness measuring instrument configured to measure thickness of a metal film layer; and a transparent insulating layer thickness determining calculator configured to calculate thickness of the transparent insulating layer according to the thickness of the metal film layer; a glue applying machine configured to apply glue on a side, near the array substrate, of the color film substrate according to the thickness of the transparent insulation layer, wherein the transparent insulation layer is provided on a side of the color film substrate, and the metal film layer is provided on a side of the array substrate that is paired with the color film substrate, and the transparent insulating layer is provided opposite to the metal film layer.

The inventor has unexpectedly found that with the glue applying system according to the embodiment of the present disclosure, the formed thickness of the transparent insulating layer can be flexibly adjusted according to the thickness information of the metal film layer, such that the transparent insulating layer and the metal film layer meet specific application requirements, for example, the vertical distances of any point on the lower surface of the transparent insulation layer from the metal film layer can be allowed to be more uniform.

According to the embodiment of the present disclosure, by adjusting the thickness of the transparent insulation layer, the difference between a maximum value and a minimum value of vertical distances of points on a surface of the transparent insulating layer facing the array substrate from the metal film layer does not exceed 2% of the maximum value. As such, the display device formed by the color film substrate and the array substrate has a satisfactory display effect, and picture quality problems such Mura and the like are significantly relieved.

In addition, the glue applying system according to the above embodiment of the present disclosure may also have the following additional technical features:

According to an embodiment of the present disclosure, the thickness measuring instrument further includes a film forming data tester configured to acquire film forming data of the metal film layer, and a metal film layer thickness calculator configured to calculate thickness of the metal film layer according to the film forming data.

According to an embodiment of the present disclosure, the glue applying machine further includes: a time-pressure graph calculator configured to calculate the time-pressure graph for applying glue according to the thickness of the transparent insulating layer; and a glue applicator configured to apply glue according to the time-pressure graph. According to an embodiment of the present disclosure, the film forming data includes square resistance of the metal film layer.

Additional aspects and advantages of the present disclosure will be set forth in part in the following description, and in part will be obvious from the following description, or may be learned by practice of the present disclosure.

BRIEF DESCRIPTION OF THE DRAWINGS

The above and/or additional aspects and advantages of the present disclosure will become apparent and easily understood from the following description of embodiments in conjunction with the accompanying drawings, in which.

REFERENCE SIGNS 100 color film substrate
110 substrate
120 black matrix layer
130 color filtering layer
140 transparent insulation layer
200 array substrate
210 target
220 metal film layer
300 thickness measuring instrument
400 transparent insulation layer thickness determination module
500 glue applying machine
510 nozzle

DETAILED DESCRIPTION

Now the embodiments of the present invention will be described in detail. Those skilled in the art will understand that the following embodiments are intended to explain the present disclosure and should not be construed as limiting the present disclosure. Unless otherwise specified, in the following embodiments where specific techniques or conditions are not explicitly described, those skilled in the art may make a performance according to commonly used technologies or conditions in the art or according to product specifications. All the used reagents or instruments which are specified by the manufacturer are commercially available customary products.

In an existing manufacture process, a low uniformity of the cell gap (the thickness of the liquid crystal cell) is obtained after the liquid crystal is finally filled in the cell section (i.e., the cell forming process including forming the orientating film, dripping liquid crystal and aligning the cells, etc.). This may result in non-uniformity of the indicator brightness during power-on operation, and further various defects, i.e., the problem of target mura (nonuniform brightness), which tends to result in a higher worse quality rate of the manufactured display.

Therefore, at this stage, the method for manufacturing a TFT-LCD display panel needs to be improved.

In one aspect of the present disclosure, the present disclosure provides a method of preparing a color film substrate.

According to an embodiment of the present disclosure, a method of preparing a color film substrate comprises forming a transparent insulating layer at a side of a body of the color film substrate, wherein the thickness of the transparent insulating layer is determined according to the thickness of the metal film layer on the array substrate that is paired with the color film substrate. Those skilled in the art can understand that the method for preparing a color film substrate is not limited to the step of forming a transparent insulating layer, but may also include other preparation steps, for example, a step of treating a surface of a substrate, a step of forming a black matrix layer, and a step of filling the color filtering layer, etc., which steps can be performed according to routine operations in the art and will not be described too much herein.

It should be noted that as used here, the description "array substrate paired with the color film substrate" or "array substrate that (or which) is paired with the color film substrate" refers to an array substrate that is aligned with the color film substrate when the color film substrate is used to prepare a display panel. As used here, the description "metal film layer on the array substrate" refers to at least one layer of plated film formed by sputtering during the preparation of the TFT. The transparent insulating layer is an existing structure in the color film substrate, for example, may be a flat layer.

The inventor of the present disclosure has found through research that in the preparation process of the CF substrate, the thickness of the transparent insulating layer of the CF substrate may be adjusted correspondingly in advance according to thickness information of the metal film layer on the surface of the TFT substrate, such that the adjustability of thickness of the CF substrate can be realized. Accordingly, the difference in the thickness of the metal film layer on the surface of the TFT substrate is compensated, furthermore the uniformity of the cell gap after the liquid crystal is filled in the cell section is improved, and the picture quality problems such as Mura due to the difference in thickness of the sputtered film formed on the upper surface of the TFT substrate may be effectively solved.

According to embodiments of the present disclosure, the specific forming manner of the transparent insulating layer is not particularly limited, and any method known in the art for forming a transparent insulating layer on the surface of the color film substrate may be used. In some embodiments of the present disclosure, the transparent insulating layer is formed by applying glue. As such, since the glue application process has higher controllability, the higher adjustability of the thickness of the transparent insulating layer on the surface of CF substrate can be realized by regulating the process parameters in the glue application process according to the thickness of the metal film layer on the array substrate during the formation of the transparent insulation layer.

According to an embodiment of the present disclosure, the step of forming a transparent insulating layer further comprises: acquiring film forming data of the metal film layer on the array substrate paired with the color film substrate; determining the thickness of the metal film layer according to the film forming data; determining the thickness of the transparent insulating layer according to the thickness of the metal film layer; determining the pressure-time graph for applying glue according to the thickness of the transparent insulating layer; applying glue according to the pressure-time graph for applying glue to form the transparent insulating layer. As such, according to actual use requirements, the thickness of the transparent insulating layer of the CF substrate can be flexibly adjusted according to the film forming data of the metal film layer on the surface of the TFT substrate, so as to better meet the use requirements and improve the display effect of the display panel using the color film substrate. For example, the compensation for the difference in the thickness of the metal film layer on the surface of the TFT substrate may be realized by adjusting the thickness of the transparent insulating layer, and the uniformity of the cell gap after the liquid crystal is filled in the cell section can be further improved, thereby avoiding the phenomena such as non-uniform brightness.

The inventor of the present disclosure has found through long-term research that the acquired film forming data of the metal film layer on the array substrate paired with the color film substrate may be converted into the thickness data of the metal film layer, and the required thickness of the corresponding transparent insulating layer is calculated, and then according to the thickness, the pressure-time graph in the glue application process is further designed to regulate the thickness of the transparent insulating layer formed on the surface of the color film substrate in the glue application process, thereby obtaining a transparent insulating layer that can compensate for the difference in thickness of the surface of the array substrate designed by the film forming data of the metal film layer on the array substrate paired with the color film substrate.

According to an embodiment of the present disclosure, the specific type of film forming data is not particularly limited, and any known data type in the art may be used as long as the data can effectively reflect the thickness information of the metal film layer on the array substrate paired with the color film substrate. In some embodiments of the disclosure, the film forming data includes square resistance of the metal film layer. As such, the data of the square resistance can be used to reflect the thickness information of the metal film layer on the array substrate more sensitively and quickly, further improve the adjustment effect of the thickness of the transparent insulating layer on the color film substrate, further improve the uniformity of the cell gap after the liquid crystal is filled in the cell section, and solve more effectively the picture quality problems such as Mura due to the difference in thickness of the sputtered film formed on the upper surface of the TFT substrate. In addition, the square resistance can be obtained directly from the manufacturer of the array substrate, and does not need to be measured separately. Thus, the operation steps are simple, convenient, and fast.

Those skilled in the art can understand that, when the color film substrate and the array substrate are used to prepare the display panel, they have to be aligned and contact with each other, or are subject to cell docking process. If an existing color film substrate with a flat lower surface is used, after the cell docking process, due to the difference in thickness of the metal film layer on the upper surface of the array substrate caused by the film plating principle with the planar targets, there are differences between the cell thickness of the liquid crystal cells corresponding to different positions: at the position where the metal film layer thickness is relatively large, the cell thickness of the liquid crystal cell is relatively small, while at the position where the metal film layer thickness is relatively small, the cell thickness of the liquid crystal cell is relatively large correspondingly. This non-uniform cell gap is prone to cause non-uniform luminance display of pictures. According to an embodiment of the present disclosure, the adjustment of the thickness of the transparent insulation layer according to the thickness of the metal film layer on the array substrate may allow the difference between a maximum value and a minimum value of vertical distances of points on a surface of the transparent insulating layer facing the array substrate from a surface of the metal film layer facing the color film substrate not to exceed 2% of the maximum value. Specifically, referring to FIG. 2, if the thickness of the metal film layer 220 on the array substrate 200 is small, the thickness of the transparent insulating layer 140 at the corresponding position is large, and if the thickness of the metal film layer 220 on the array substrate 200 is large, the thickness of the transparent insulating layer 140 at the corresponding position is small. Thus, the adjustment of the thickness of the transparent insulating layer according to the thickness of the metal film layer on the array substrate can effectively ensure better uniformity of vertical distances L at all points from the lower surface of the transparent insulating layer to the upper surface of the metal film on the array substrate. As such, the prepared transparent insulating layer on the surface of the color film substrate comply with the above standard, can further improve the uniformity of the cell gap after the liquid crystal is filled in the cell section, and can more effectively solve the picture quality problems such as Mura caused by the difference in thickness of the sputtered film formed on the upper surface of the TFT substrate.

According to the embodiment of the present disclosure, by adjusting the thickness of the transparent insulation layer, the difference between a maximum value and a minimum value of vertical distances of points on a surface of the transparent insulating layer facing the array substrate from a surface of the metal film layer facing the color film substrate does not exceed 2% of the maximum value. For example, in some embodiments of the present disclosure, the difference between a maximum value and a minimum value of vertical distances of points on a surface of the transparent insulating layer facing the array substrate from a surface of the metal film layer facing the color film substrate does not exceed 1% of the maximum value. In another embodiment, a maximum value and a minimum value of vertical distances of points on a surface of the transparent insulating layer facing the array substrate from a surface of the metal film layer facing the color film substrate are equal. As such, the display device comprising the color film substrate has a satisfactory display effect, and picture quality problems such Mura and the like are significantly relieved.

It should be noted that the direction "upper" used in the description of the present disclosure refers to the direction in which the color film substrate is directed towards the user during actual use, and "lower" refers to the direction in which the color film substrate is directed away from the user during actual use.

In summary, according to the embodiments of the present disclosure, the present disclosure provides a method for preparing a color film substrate, which adjusts the thickness of the transparent insulating layer of the CF substrate according to the thickness information of the TFT substrate having a difference in surface height, such that the vertical distances from all points on the lower surface of the CF substrate to the upper surface of the TFT substrate, after the cell docking process, is more uniform, and the uniformity of the cell gap after the liquid crystal is filled in the cell section is improved, and the picture quality problems such as Mura due to difference in thickness of the sputtered film formed on the upper surface of the TFT substrate is effectively solved.

In another aspect of the present disclosure, the present disclosure provides a color film substrate. According to an embodiment of the present disclosure, the color film substrate is prepared by the above method. Since the thickness of the transparent insulating layer on the surface is adjusted according to the thickness information of the metal film layer on the TFT substrate paired with the transparent insulating layer, a specific use requirement may be satisfied between the color film substrate and the array substrate according to actual needs, thereby improving the use effect of the display panel containing the color film substrate and the array substrate. For example, by adjusting the thickness of the transparent insulating layer, the vertical distances between the color film substrate and the array substrate may be allowed to more uniform, so that the uniformity of the cell gap after the liquid crystal is filled in the cell section can be improved, and the picture quality problems such as Mura due to difference in thickness of the sputtered film formed on the upper surface of the TFT substrate is effectively solved. Those skilled in the art can understand that the features and advantages described above for the method for preparing a color film substrate are still applicable to the color film substrate. Repeated description will not be made herein.

In another aspect of the present disclosure, the present disclosure provides a method of preparing a display panel.

According to an embodiment of the present disclosure, the method for preparing a display panel comprises: providing an array substrate and a color film substrate, wherein the color film substrate is prepared by the aforesaid method; and performing cell docking for the array substrate and the color film substrate. Those skilled in the art can understand that the method for preparing the color film substrate is not only limited to the steps of providing the array substrate and the color film substrate and performing cell docking, but instead, may further comprise other preparation steps, for example, a step of forming an orientating film on the upper surface of the array substrate and the lower surface of the color film substrate, a step of filling liquid crystal, a step of pasting a polarizer, etc. Repeated description is not made too much here.

The inventor of the present disclosure has found through research that a display panel with high uniform cell gap is obtained by preparing a color film substrate that can compensate for the difference in thickness of the surface of the array substrate according to the thickness of the metal film layer on the array substrate paired with the color film substrate, and performing cell docking process for the array substrate. Accordingly, the picture quality of the TFT-LCD is improved. Moreover, the method for preparing the display panel can reduce the worse quality rate of the display. It should be noted that the "cell docking" process refers to the preparation steps of accurately matching in position the color film substrate and the array substrate paired with each other, combining them as one piece, and then performing the edge-sealing on the peripheral sides of the two substrates to obtain the display panel.

In summary, according to the embodiments of the present disclosure, the present disclosure provides a method for preparing a display panel, which allows the vertical distances from all points on the lower surface of the color film substrate of the thus obtained display panel to the upper surface of the TFT substrate to be more uniform. Accordingly, the uniformity of the cell gap after the liquid crystal is filled in the cell section is improved, and the picture quality problems such as Mura due to difference in thickness of the sputtered film formed on the upper surface of the TFT substrate is effectively solved. Those skilled in the art can understand that the features and advantages described above for the method for preparing a color film substrate are still applicable to the method for preparing the display panel. Repeated description will not be made herein.

In another aspect of the present disclosure, the present disclosure provides a display panel. According to an embodiment of the present disclosure, the display panel is prepared by the aforesaid method. The thickness of the transparent insulating layer on the lower surface of the color film substrate is determined by the thickness of the metal film layer on the array substrate. Accordingly, specific use requirements can be satisfied between the color film substrate and the array substrate according to actual needs. In some embodiments of the present disclosure, the vertical distances from all points on the lower surface of the color film substrate to the metal film layer of the upper surface of the TFT substrate is more uniform. Accordingly, the uniformity of the cell gap after the liquid crystal is filled in the cell section is improved, and the picture quality problems such as Mura due to difference in thickness of the sputtered film formed on the upper surface of the TFT substrate is effectively solved. Those skilled in the art can understand that the features and advantages described above for the method for preparing a color film substrate and for the color film substrate are still applicable to the display panel. Repeated description will not be made herein.

In another aspect of the present disclosure, the present disclosure provides a display device. The display device of the present disclosure will be described in detail with reference to FIGS. 2 to 3.

Figure 2:
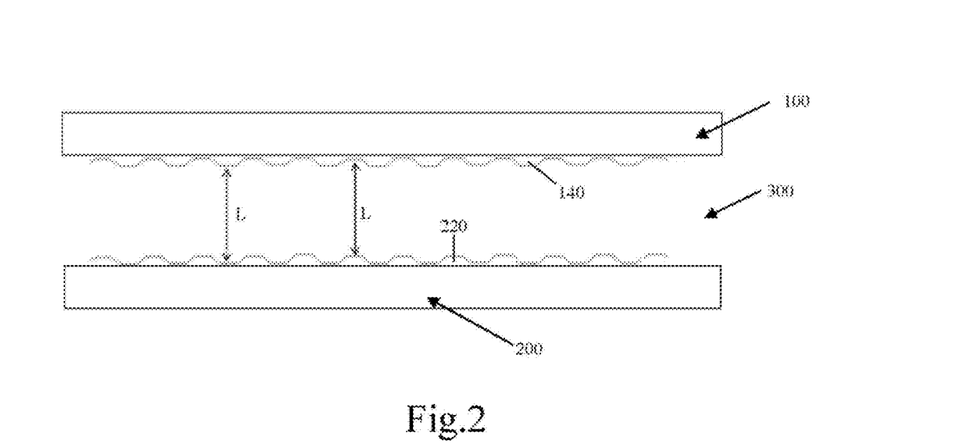
FIG. 2 is a schematic structural view of a display panel according to an embodiment of the present disclosure.

According to an embodiment of the present disclosure, referring to FIG. 2, the display device comprises: an array substrate (TFT) 200 and a color film substrate (CF) 100 disposed opposite to each other, and a liquid crystal layer 300 disposed between the array substrate 200 and the color film substrate 100, wherein a metal film layer 220 is disposed on a side of the array substrate 200 adjacent to the color film substrate 100, a transparent insulating layer 140 is disposed on a side of the color film substrate 100 adjacent to the array substrate 200, and the thickness of the transparent insulation layer 140 is determined according to the thickness of the metal film layer 220. Those skilled in the art can understand that the display device is not only limited to the array substrate and the color film substrate, but instead may also include other components such as an orientating film, a polarizer, or a frame sealant, etc. Repeated description will not be made herein.

Figure 3:
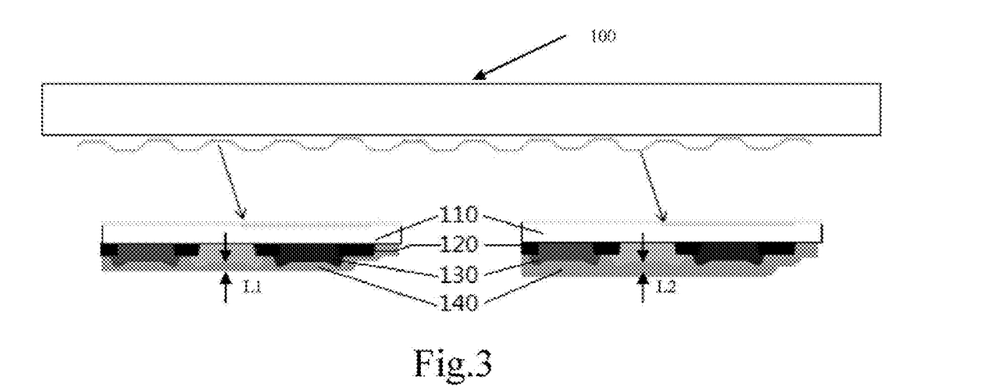
FIG. 3 is a schematic view of an internal structure of a color film substrate according to an embodiment of the present disclosure.

According to an embodiment of the present disclosure, referring to FIG. 3, the color film substrate further includes a substrate 110, a black matrix layer 120 and a color filtering layer 130, wherein the black matrix layer 120 and the color filtering layer 130 are both disposed on the lower surface of the substrate 110, the black matrix layer 120 has a plurality of openings, the color filtering layer 130 is disposed in the plurality of openings of the black matrix layer 120, and the transparent insulation layer 140 is disposed on the lower surfaces of the color filtering layer 130 and the black matrix layer 120. As can be seen from the figure, at the position as shown at the left side the thickness L1 of the transparent insulating layer 140 is relatively small, and at the position as shown at right side the thickness L2 of the transparent photoresist 140 is relatively large.

In addition, according to an embodiment of the present disclosure, the difference between a maximum value and a minimum value of vertical distances of points on a surface of the transparent insulating layer 140 facing the array substrate from a surface of the metal film layer on the array substrate facing the color film substrate is not larger than 2% of the maximum value. As such, using the transparent insulating layer with the aforesaid standard can allow the thickness of the color film substrate to effectively compensate for the difference in the height of the upper surface of the TFT substrate, and allow the vertical distance from any point on the lower surface of the CF substrate of the display panel to the metal film layer on the TFT substrate to be more uniform, thereby improving the uniformity of the cell gap after the liquid crystal is filled in the cell section, and effectively solving the picture quality problems such as Mura caused by the difference in thickness of the sputtered film formed on the upper surface of the TFT substrate.

Specifically, in some embodiments of the present disclosure, the difference between a maximum value and a minimum value of vertical distances from points on a surface of the transparent insulating layer facing the array substrate to a surface of the metal film layer facing the color film substrate does not exceed 1% of the maximum value. In other embodiments of the present disclosure, the maximum value and the minimum value of vertical distances from points on the surface of the transparent insulating layer facing the array substrate to a surface of the metal film layer facing the color film substrate are equal to each other. As such, the display device comprising the color film substrate has a satisfactory display effect, and picture quality problems such Mura and the like are significantly relieved.

To sum up, according to an embodiment of the present disclosure, the present disclosure provides a display device, which has better uniform cell gap and thus can effectively solve the picture quality problems such as Mura.

Figure 4:
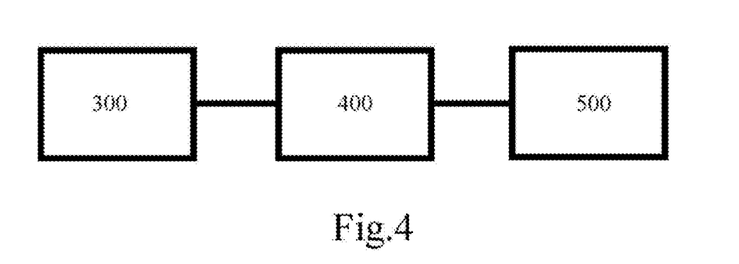
FIG. 4 is a schematic component view of a glue application according to an embodiment of the present disclosure.

In another aspect of the present disclosure, the present disclosure provides a glue applying system. Referring to FIG. 4, detailed description will be made to the glue application according to the present disclosure.

According to an embodiment of the present disclosure, referring to FIG. 4, the glue applying system includes three main modules: a thickness measuring instrument 300, a transparent insulating layer thickness determining calculator 400, and a glue applying machine 500, wherein the thickness measuring instrument 300 is configured to measure the thickness information of the metal film layer; the transparent insulating layer thickness determining calculator 400 is configured to calculate the thickness of the transparent insulating layer according to the thickness information of the metal film layer; and the glue applying machine 500 is configured to apply glue on a side, near the array substrate, of the color film substrate according to the thickness of the transparent insulation layer, wherein the transparent insulation layer is disposed on a side of the color filter substrate, the metal film layer is disposed on a side of the array substrate paired with the color filter substrate, and the transparent insulating layer is disposed opposite to the metal film layer. The glue applying system can be directly used in the above-mentioned preparation process of the color film substrate and the display panel, so as to obtain a transparent photoresist layer on the CF substrate that can compensate for the metal film layer on the TFT substrate with difference in surface height, so that the vertical distance from any point on the lower surface of the CF substrate to the metal film layer on the TFT substrate is more uniform, the uniformity of the cell gap after the liquid crystal is filled in the cell section is improved, the picture quality problems such as Mura due to the difference in thickness of the sputtered film formed on the upper surface of the TFT substrate are effectively solved.

In addition, according to an embodiment of the present disclosure, the thickness measuring instrument 300 further includes: a film forming data tester and a metal film layer thickness calculator, wherein the film forming data tester is configured to acquire the film forming data of the metal film layer, and the metal film layer thickness calculator is configured to calculate the thickness of the metal film layer according to the film forming data. As such, by converting the obtained film forming data of the metal film layer into the thickness information of the metal film layer, the thickness information of the metal film layer can be obtained more simply and quickly.

Specifically, according to an embodiment of the present disclosure, the specific type of film forming data is not particularly limited, and any known data type in the art may be used as long as the data can effectively reflect the thickness information of the metal film layer. In some embodiments of the disclosure, the film forming data includes square resistance of the metal film layer. As such, the data of the square resistance can be used to reflect the thickness information of the metal film layer more sensitively and quickly.

Figure 5:
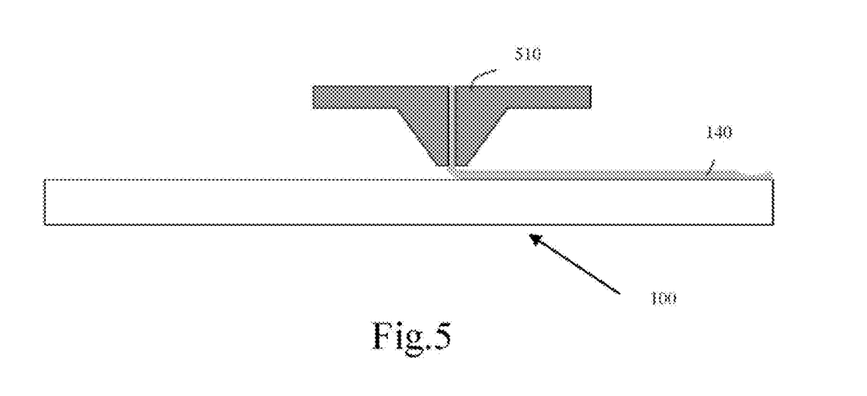
FIG. 5 is a schematic view of a glue application process according to an embodiment of the present disclosure.

In addition, according to an embodiment of the present disclosure, the glue applying machine 500 further includes a time-pressure graph calculator and a glue applicator, wherein the time-pressure graph calculator is configured to calculate the time-pressure graph for applying glue according to the thickness of the transparent insulating layer, and the glue applicator is configured to apply glue according to the time-pressure graph. Refer to FIG. 5 for the schematic view of applying glue, in which the glue applicator comprises a nozzle 510 which is configured to apply the transparent insulation layer 140 on a side of the color film substrate. As such, a transparent insulation layer that can compensate for a preset film layer with difference in surface height can be obtained by, based on determination of the thickness of the transparent insulating layer according to the thickness information of the metal film layer, determining the time-pressure graph required for applying glue, and then applying glue on the surface of the CF substrate.

According to an embodiment of the present disclosure, determination of the thickness of the transparent insulation layer according to the thickness of the metal film layer may allow the difference between a maximum value and a minimum value of vertical distances of points on a surface of the transparent insulating layer facing the array substrate from a surface of the metal film layer facing the color film substrate does not exceed 2% of the maximum value. For example, in some embodiments of the present disclosure, the difference between a maximum value and a minimum value of vertical distances of points on a surface of the transparent insulating layer facing the array substrate from a surface of the metal film layer facing the color film substrate does not exceed 1% of the maximum value. In other embodiments of the present disclosure, the maximum value and the minimum value of vertical distances of points on the surface of the transparent insulating layer facing the array substrate from a surface of the metal film layer facing the color film substrate are equal to each other. As such, the display device comprising the color film substrate has a satisfactory display effect, and picture quality problems such Mura and the like are significantly relieved. In summary, according to an embodiment of the present disclosure, the present disclosure provides a glue applying system, which can adjust the formed thickness of the transparent insulating layer according to the thickness information of the metal film layer with difference in surface height, so as to allow the vertical distance from any point on the lower surface of the transparent insulation layer to the upper surface of the metal film layer to be more uniform, to help improve the display effect of the display panel, and relieve the picture quality problems such as Mura.

In according to one embodiment, the components of the glue applying system may be implemented with corresponding prior components but according to the arrangement of the relationship in function and time sequence provided by the present disclosure.

In the description of the present disclosure, it is to be understood that the orientation or positional relationship indicated by the terms such as "center", "longitudinal", "lateral", "length", "width", "thickness", "upper", "lower", "front", "back", "left", "right", "vertical", "horizontal", "top", "bottom", "inside", "outside", "clockwise", "counter-clockwise", "axial", "radial", "circumferential" is the orientation or positional relationship as shown based on the drawings, and is merely for convenience of description of the present disclosure and simplified description, but does not indicate or imply that a device or element must have a particular orientation, be constructed and operated in a particular orientation, and therefore should not be construed to limit the disclosure.

In the description of the present disclosure, the terms such as "mount", "connect", "connect with" and "fix" shall be understood in a broad sense unless otherwise specified or defined, for example, may be fixed connection, may also be detachable connection, or integrated; may be mechanical or electrical connection; may be direct connection, may also be indirect connection through the intermediate medium, may be the internal communication of two components or the interaction between two components. Those skilled in the art can understand the specific meanings of the above terms in the present disclosure according to specific circumstances.

In the description of the present specification, the description with reference to terms such as "an embodiment", "some embodiments", "an example", "a specific example", or "some examples" is intended to indicate that the specific features, structures, materials, or characteristics as described in conjunction with the embodiment or the example are included in at least one embodiment or example of the present disclosure. In this specification, the schematic representation of the above terms does not necessarily have to refer to the same embodiment or example. Furthermore, the described particular features, structures, materials, or characteristics may be combined in any suitable manner in any one or more of the embodiments or examples. In addition, those skilled in the art may combine and group the different embodiments or examples described in this specification and features of different embodiments or examples without conflicting with each other.

Although the embodiments of the present disclosure have been shown and described above, it is to be understood that the above embodiments are exemplary and not to be construed as limiting the present disclosure. Those skilled in the art can make variations, modifications, substitutions and changes to the above-described embodiments within the scope of the present disclosure.

What is claimed is:

1. A method for preparing a color film substrate, comprising forming a transparent insulating layer, wherein a thickness of the transparent insulating layer is determined according to a thickness of a metal film layer on an array substrate that is paired with the color film substrate,
    wherein the transparent insulating layer is formed by applying glue on the color film substrate, and the step of forming the transparent insulating layer comprises:
    acquiring film forming data of the metal film layer on the array substrate paired with the color film substrate;
    determining the thickness of the metal film layer according to the film forming data;
    determining the thickness of the transparent insulating layer according to the thickness of the metal film layer;
    determining a pressure-time graph for applying glue on the color film substrate according to the thickness of the transparent insulating layer; and
    applying glue on a side, near the array substrate, of the color film substrate according to the pressure-time graph for applying glue to form the transparent insulating layer.

2. The method for preparing a color film substrate according to claim 1, wherein the film forming data comprises square resistance of the metal film layer.

3. The method for preparing a color film substrate according to claim 1, wherein a difference between a maximum value and a minimum value of vertical distances from points on a surface of the transparent insulating layer facing the array substrate to a surface of the metal film layer facing the color film substrate does not exceed 2% of the maximum value.

4. A color film substrate, wherein the color film substrate is prepared by the method according to claim 1.

5. A display device, comprising:
    an array substrate;
    a color film substrate provided opposite to the array substrate; and
    a liquid crystal layer provided between the array substrate and the color film substrate,
    wherein a metal film layer is provided on a side of the array substrate near the color film substrate, a transparent insulating layer is provided on a side of the color film substrate near the array substrate, the transparent insulating layer is formed by applying glue on the color film substrate, and a thickness of the transparent insulation layer is determined according to a thickness of the metal film layer.

6. The display device according to claim 5, wherein the color film substrate comprises:
    a substrate;
    a black matrix layer provided on a side of the substrate facing the array substrate and having a plurality of openings; and
    a color filtering layer provided on the side of the substrate facing the array substrate and being in the plurality of openings of the black matrix layer, and
    wherein the transparent insulation layer provided on sides of the color filtering layer and of the black matrix layer away from the substrate,
    wherein a difference between a maximum value and a minimum value of vertical distances from points on a surface of the transparent insulating layer facing the array substrate to a surface of the metal film layer facing the color film substrate does not exceed 2% of the maximum value.

7. A glue applying system, comprising:
    a thickness measuring instrument configured to measure a thickness of a metal film layer;
    a transparent insulating layer thickness calculator configured to calculate a thickness of a transparent insulating layer according to the thickness of the metal film layer; and
    a glue applying machine configured to apply glue on a side, near the array substrate, of the color film substrate according to the thickness of the transparent insulation layer,
    wherein the transparent insulation layer is provided on a side of the color film substrate, the metal film layer is provided on a side of the array substrate that is paired with the color film substrate, and the transparent insulating layer is provided opposite to the metal film layer.

8. The glue applying system according to claim 7, wherein the thickness measuring instrument further comprises:
    a film forming data tester configured to acquire film forming data of the metal film layer; and
    a metal film layer thickness calculator configured to calculate a thickness of the metal film layer according to the film forming data.

9. The glue applying system according to claim 8, wherein the glue applying machine further comprises:

a time-pressure graph calculator configured to calculate a time-pressure graph for applying glue according to the thickness of the transparent insulating layer; and a glue applicator configured to apply glue according to the time-pressure graph.

10. The glue applying system according to claim 8, wherein the film forming data comprises square resistance of the metal film layer.

11. The method for preparing a color film substrate according to claim 2, wherein a difference between a maximum value and a minimum value of vertical distances from points on a surface of the transparent insulating layer facing the array substrate to a surface of the metal film layer facing the color film substrate does not exceed 2% of the maximum value.

12. The method for preparing a color film substrate according to claim 1, wherein a difference between a maximum value and a minimum value of vertical distances from points on a surface of the transparent insulating layer facing the array substrate to a surface of the metal film layer facing the color film substrate does not exceed 1% of the maximum value.

13. The method for preparing a color film substrate according to claim 2, wherein a difference between a maximum value and a minimum value of vertical distances from points on a surface of the transparent insulating layer facing the array substrate to a surface of the metal film layer facing the color film substrate does not exceed 1% of the maximum value.

14. The method for preparing a color film substrate according to claim 1, wherein a maximum value and a minimum value of vertical distances from points on a surface of the transparent insulating layer facing the array substrate to a surface of the metal film layer facing the color film substrate are equal.

15. The method for preparing a color film substrate according to claim 2, wherein a difference between a maximum value and a minimum value of vertical distances from points on a surface of the transparent insulating layer facing the array substrate to a surface of the metal film layer facing the color film substrate are equal.

16. A color film substrate, wherein the color film substrate is prepared by the method according to claim 2.

17. A color film substrate, wherein the color film substrate is prepared by the method according to claim 12.

18. The display device according to claim 6, wherein the difference does not exceed 1% of the maximum value.

19. The display device according to claim 6, wherein the maximum value and the minimum value are equal.

* * * * *